United States Patent

Huemke et al.

[11] Patent Number: 5,389,705
[45] Date of Patent: Feb. 14, 1995

[54] POLYMERS SUITABLE AS BINDERS

[75] Inventors: Klaus Huemke, Friedelsheim; Helmut Fobbe, Muenster; Konrad Knoll, Mannheim, all of Germany

[73] Assignee: BASF Lacke + Farben Aktiengesellschaft, Muenster, Germany

[21] Appl. No.: 102,756

[22] Filed: Aug. 6, 1993

[30] Foreign Application Priority Data

Aug. 14, 1992 [DE] Germany .............. 4227030

[51] Int. Cl.$^6$ .............. C08J 3/00; C08K 3/20; C08L 63/00
[52] U.S. Cl. .............. 523/417; 523/400; 523/402; 523/406; 523/414; 524/514; 524/538; 524/555; 524/579; 524/589; 524/606; 524/608; 524/839; 524/840; 525/107; 525/113; 525/120; 525/123; 525/131; 525/423; 525/424; 525/426; 525/430; 525/454; 525/455; 528/44; 528/60; 528/61; 528/68; 528/69; 528/335; 528/341; 528/367; 528/393; 528/407; 528/422
[58] Field of Search .............. 523/400, 402, 406, 411, 523/414, 417; 525/107, 111, 113, 120, 123, 131, 514, 423, 424, 426, 430, 435, 454, 455, 540; 524/538, 555, 579, 589, 606, 608, 839, 840, 514, 579; 528/335, 367, 422, 44, 60, 61, 68, 69, 341, 393, 407

[56] References Cited

U.S. PATENT DOCUMENTS 4,102,846 7/1978 Bentley et al. .............. 260/31.2 N
5,057,195 10/1991 Ueda et al. .............. 204/181.4
5,213,648 5/1993 Vermeulen et al. .............. 524/608

FOREIGN PATENT DOCUMENTS 381347 8/1990 European Pat. Off. .
398755 11/1990 European Pat. Off. .
411576 2/1991 European Pat. Off. .
416762 3/1991 European Pat. Off. .
439074 7/1991 European Pat. Off. .

*Primary Examiner*—Paul R. Michl
*Assistant Examiner*—Patrick Niland
*Attorney, Agent, or Firm*—Keil & Weinkauf

[57] ABSTRACT

Novel polymers which are suitable as binders are obtainable by reacting (A) a base resin which has an average molecular weight $\overline{M}_w$ of from 200 to 5,000 and contains on average from 1 to 3 epoxy or isocyanato groups as the reactive groups per molecule with (B) a mixture of
  (B1) 5 to 50% by weight of polyisobutylene which is terminated with primary amino groups and has an average molecular weight $\overline{M}_w$ of from 500 to 5,000 and
  (B2) 5-95% by weight of an amidoamine which carries primary amino groups and is obtainable by condensation of diprimary diamines of 2 to 20 carbon atoms with aliphatic $C_2$-$C_{44}$-dicarboxylic acids, the amounts being such that from 1 to 5 equivalents of primary amino groups of (B) are present per equivalent of reactive groups of (A).

10 Claims, No Drawings

POLYMERS SUITABLE AS BINDERS

The present invention relates to novel polymers which are suitable as binders and are obtainable by reacting
(A) a base resin which has an average molecular weight $\overline{M}_w$ of from 200 to 5,000 and contains on average from 1 to 3 epoxy or isocyanato groups as the reactive groups per molecule
with
(B) a mixture of
(B1) 5 to 50% by weight of a polyisobutylene terminated by primary amino groups and having an average molecular weight $\overline{M}_w$ of from 500 to 5,000 and
(B2) 5-95% by weight of an amidoamine carrying primary amino groups and obtained by condensation of diprimary diamines of 2 to 20 carbon atoms with aliphatic $C_2$-$C_{44}$-dicarboxylic acids,
the amounts being such that from 1 to 5 equivalents of primary amino groups of (B) are present per equivalent of the reactive group of (A).

The present invention furthermore relates to a process for the preparation of such polymers and to the use thereof.

In the electrocoating of automotive bodywork, attention has recently focused in particular on the problem of the poor edge coverage and the associated pronounced corrosion at the edges.

Under the influence of the surface tension and due to low viscosities of the wet film during the baking process, the conventional electrocoating systems exhibit greater or lesser withdrawal of the coating layer from the substrate edges and hence exposure of the sheet metal surface and consequent increased corrosion in the salt spray and climatic cycling test.

DE-A 39 26 635 discloses an electrocoating method which is suitable in particular for coating edges and in which magnetic particles are added to the electrocoating finish.

EP-A 398 755 describes an electrocoating finish which has good edge protection properties and consists of a self-crosslinking polyepoxy resin carrying blocked isocyanato groups, and gelled particles based on alkoxysilane-modified acrylate copolymers and colloidal silica.

EP-A 411 576 relates to cathodic polymers which were obtained by a two-stage emulsion polymerization, vinylsilane monomers, vinylic monomers having hydroxyl functional groups and further unsaturated monomers being polymerized in the first stage and polymerization of specific blocked isocyanates and vinyl monomers having hydroxyl functional groups being carried out in the second stage in the presence of the polymer of the first stage.

EP-A 416 762 likewise discloses cathodic coating mixtures which have good edge protection properties and contains a cationic acrylate copolymer, a urethanized epoxy resin and a blocked isocyanate crosslinking agent.

EP-A 439 074 describes electrocoating finish mixtures which consist of a cationic resin having hydroxyl functional groups, an epoxy resin and finely divided gelled polymer particles based on acrylates.

Cationic electrocoating finishes which have good edge protection properties and contain conventional cationic aminoepoxy resin and in addition crosslinked microparticles are also disclosed in EP-A 381 347.

As is evident from the applications described, the solutions known to date for the edge protection problem are mainly limited to additives to conventional epoxy resins, in the form of either magnetic particles or crosslinked microparticles, such as microgels.

It is an object of the present invention to provide polymers which are suitable as binders for electrocoating finishes and afford good edge corrosion protection for the coated articles.

We have found that this object is achieved by the polymers described at the outset.

Base resins (A) used are polymers which have an average molecular weight $\overline{M}_w$ of 200–5,000, preferably 500–5,000, and contain on average from 1 to 3 epoxy or isocyanato groups as reactive groups per molecule. In this context, reactive groups means that they are reactive to amino groups.

Examples of suitable components (A) are epoxy resins which are obtainable by reacting a polyhydric phenol with an epihalohyrin.

A molecular weight can be controlled by the molar ratio of the starting compounds. Examples of such polyhydric phenols are resorcinol, hydroquinone, 2,2-di-(4-hydroxyphenyl)-propane (bisphenol A), p,p'-dihydroxybenzophenone, p,p'-dihydroxybiphenyl, 1,1-di-(4-hydroxyphenyl)-ethane, bis-(2-hydroxynaphthyl)-methane, 1,5-dihydroxynaphthylene and novolaks. Bisphenol A is preferred. The preferred epihalohydrin is epichlorohydrin.

In addition to epoxy resins obtained from polyhydric phenols and epihalohydrins, polyglycidyl ethers of polyhydric alcohols, such as ethylene glycol, diethylene glycol, triethylene glycol, 1,2-propylene glycol, 1,3-propylene glycol, 1,4-butanediol, 1,5-pentanediol, 1,6-hexanediol, 1,2,6-hexanetriol, glycerol or bis-(4-hydroxycyclohexyl)-2,2-propane, may be used.

Very particularly preferred epoxy resins are those which are obtainable by reacting diglycidyl ethers of bisphenol A with polyhydric phenols, in particular bisphenol A, or by reacting with long-chain alkylphenols, such as 4-nonylphenol, or monoether glycols, such as 2-phenoxypropan-1-ol . Such reactions can be catalyzed by amines, such as dibenzylamine.

Further suitable components (A) are aminoepoxy resins which also carry free epoxy groups. Such compounds are obtainable in a known manner by partial reaction of the epoxy groups of a polyglycidyl compound with secondary amines or alkanolamines. Suitable polyglycidyl compounds are the polyglycidyl compounds described above, having average molecular weights of from 180 to 2,000. Examples of suitable secondary amines are saturated dialkylamines of 2 to 36 carbon atoms, e.g. dimethylamine, methylethylamine, diethylamine, dipropylamine or dibutylamine, as well as saturated alkylalkanolamines of 3 to 36 carbon atoms, such as methylethanolamine, ethylethanolamine or methylisopropanolamine, or corresponding dialkanolamines, such as diethanolamine or diisopropanolamine.

Further suitable components (A) are polyurethane resins. These may be obtained in a known manner from aliphatic and/or aromatic diisocyanates and aliphatic diols or polyols. Examples of diisocyanates are in particular tetramethylene diisocyanate, hexamethylene diisocyanate, isophorone diisocyanate, diphenylmethane diisocyanate, toluylene diisocyanate, naphthylene diisocyanate and 4,4'-diisocyanatodiphenyl ether. Suitable diols are especially ethylene glycol, diethylene glycol, triethylene glycol, propanediol, butanediol, hexanediol, neopentylglycol and neopentylglycol hydroxypivalate. However, alcohols having a higher functionality, such as trimethylolpropane, glycerol, pentaerythritol and trimethylolbenzene, are also suitable.

Preferably used components (A) are mixtures of 50-95% by weight of bisphenol A epoxides and 5-50% by weight of polyoxyalkylene polyeroxides.

Suitable components (B1) are polyisobutylenes terminated with primary amino groups and having an average molecular weight $\overline{M}_w$ of from 500 to 5,000, preferably from 1,000 to 3,000. The preparation of such compounds is described in German Laid-Open Application DOS 4,030,914. Chloroallyl-terminated polyisobutylenes which are obtainable by reacting chlorine-terminated polyisobutylene with butadiene in the presence of a Friedel-Crafts catalyst are used as starting materials for the preparation. This chloroallyl-terminated polymer is reacted with ammonia or with an amino compound, ammonia or primary polyamines, such as alkylenediamines, e.g. ethylenediamine, butylenediamine, hexamethylenediamine or triethylenetetramines, being suitable in the present case.

The reaction of the chloroallylpolyisobutylene with the amine compound is carried out at from 60°-100° C. in the presence of an HCl-binding base, such as magnesium oxide, calcium oxide or the like, in a preferably polar aprotic organic solvent. The product is then worked up by extraction. The product thus obtained also contain an allylic double bond β to an amino group. Said double bond can, if required, be hydrogenated in a known manner, for example catalytically using Raney nickel.

In the present case, preferably used components (B1) are those in which the allylic double bond is hydrogenated. An amino-terminated polyisobutylene which has been obtained by reaction with triethylenetetramine is particularly preferred.

The components (B1) have amine numbers of from 20 to 200 mg KOH/g of substance. A sufficiently high amine number is required in order subsequently to achieve the dispersibility in water.

Suitable components (B2) are primary amino-containing amidoamines, which can be prepared by a condensation reaction from a diprimary diamine and a dicarboxylic acid and, if desired, a monocarboxylic acid. Suitable diamines are saturated diamines of 2 to 20 carbon atoms, for example straight-chain alkyldiamines, such as ethylenediamine, 1,3-diaminopropane, 1,4-diaminobutane, 1,5-diaminopentane or 1,6-diaminohexane, or branched alkylenediamines, such as 2-methylpentane-1,5-diamine or 2-ethylbutane-1,4-diamine, as well as those which contain cycloalkyl structures, e.g. 4,4-diaminocyclohexylmethane or 2-(3-aminopropyl)-cyclohexylamine. Suitable diamines may also contain oxa groups, for example 4,9-dioxadodecane-1,12-diamine or 4,7-dioxadodecane-1,10-diamine. Aromatic diamines of 6 to 14 carbon atoms, for example 4,4'-diaminodiphenylmethane, 4,4'-diaminodiphenyl ether, 4,4'-diaminodiphenyl sulfone, toluenediamine or xylylenediamine, are also suitable. Diprimary secondary polyamines, such as diethylenetriamine and triethylenetetramine, are particularly preferred.

Suitable dicarboxylic acids are aliphatic dicarboxylic acids of 2 to 44, preferably 28 to 36, carbon atoms. Dimerized unsaturated $C_{14}$-$C_{22}$-fatty acids, for example dimeric linseed oil fatty acid or dimeric ricinene fatty acid, are preferred.

Suitable monocarboxylic acids are aliphatic $C_{12}$-$C_{18}$-fatty acids, for example oleic acid, linoleic acid or linolenic acid, or linseed oil fatty acid which contains these fatty acids in the form of a mixture.

The dicarboxylic acids can be used alone for the preparation of the amidoamine, but it is advantageous if from 2 to 20 mol %, based on the dicarboxylic acid, of monocarboxylic acid are also used.

To ensure that the amidoamines also contain free primary amino groups, it is necessary to employ a sufficient excess of diprimary amine. In general, a 1.5-10, preferably 2-6, molar excess of diprimary diamine is used, and said diamine can, if required, be distilled off after the condensation reaction.

The reaction of the diamines with the dicarboxylic acids is carried out in general at from 100° to 250° C., preferably from 150° to 200° C. To facilitate removal of the water formed in the condensation, a solvent which is suitable as an entraining agent, for example toluene and xylene, may be added. The carboxylic acids can also be used in the form of their esters. In this case, an alcohol is eliminated in the condensation instead of water. Instead of fatty acids, it is therefore also possible to use fats, i.e. the glyceryl esters of the fatty acids. For the preparation of the component (B2), the primary diamines and the carboxylic acids are used in ratios of the number of equivalents of $NH_2$ to that of COOH of from about 2:1 to 10:1, preferably from 2.5:1 to 5:1.

The amidoamines thus obtained have average molecular weights $\overline{M}_n$ from 200 to 5,000, preferably from 500 to 2,500. The amine numbers are from 150 to 600, preferably from 200 to 450, mg KOH/g of substance.

Condensates of saturated $C_2$-$C_6$-alkylenediamines, dimeric linolenic acid and linseed oil fatty acid are preferred.

The amounts of the components are such that from 1 to 5, preferably from 1 to 3, primary amino equivalents of (B) are used per equivalent of the reactive groups of (A), (B) consisting of 5-50, preferably 10-40, % by weight of (B1) and 50-95, preferably 60-90, % by weight of (B2).

The reaction of the base resin (A) with (B1) and (B2) can be carried out by a procedure in which solvents are added to (A) homogeneously mixed with the amino-terminated polyisobutylene (B1) and the amidoamine (B2). Suitable solvents are butylglycol, propylene glycol phenyl ether or propylene glycol methyl ether, or mixtures thereof. The reaction mixture is then allowed to react at 100°-150° C. until no more free epoxy or isocyanato groups are present.

The binders thus obtained have average molecular weights $\overline{M}_w$ of from 1,000 to 20,000, preferably from 2,000 to 10,000, and amine numbers of from 50 to 250 mg KOH/g of solid substance.

The novel polymers may be dissolved in organic solvents, such as butylglycol, the solutions having solids contents of 1-90% by weight.

Aqueous dispersions of the novel polymers can be preferably obtained by neutralizing some or all of the amino groups of the polymer and dispersing the protonated resin with water. Suitable acids are phosphoric acid, but organic acids, for example formic acid, acetic acid, propionic acid or lactic acid, are preferred. It is also possible to add the polymer to a water/acid mixture. Organic solvents still present in the resin can then be distilled off.

The dispersions thus obtained generally have solids contents of 10–45% by weight.

It is also possible to obtain aqueous dispersions of the novel polymers with the aid of conventional emulsifiers and protective colloids.

Dispersions obtained by dispersing with an acid and having solids contents of from 20–35% by weight are preferred.

The novel aqueous dispersions are suitable in general for the production of coatings.

The novel polymers or aqueous dispersions thereof are particularly important in the production of coatings of electrocoating finishes.

The electrocoating baths may contain the novel binders in amounts of 1–30, preferably 5–20, % by weight.

In the production of the coatings of electrocoating finishes, the binders used are preferably those which are obtained by reacting a base resin which is an epoxy resin with amino-terminated polyisobutylene and an amidoamine.

If the binder polymers contain no self-crosslinking groups, the electrocoating baths must also contain crosslinking agents.

Examples of suitable crosslinking agents for these binders are urea condensates as described in DE-A 33 11 514 or phenolic Mannich bases according to DE-A 34 22 457. EP-A 134 983 also mentions, as further possible crosslinking agents, also blocked isocyanates or aminoplast resins, such as urea/formaldehyde resins, melamine resins or benzoguanamine resins.

Preferred crosslinking agents are compounds which are obtainable by aminoalkylation of methane-modified epoxy resins. Such compounds are described in the German Application P 4201054.3.

Electrocoating baths may furthermore contain pigment pastes and conventional assistants. Pigment pastes are obtainable, for example, from a grinding resin and pigments, such as titanium dioxide, carbon black or aluminum silicates, as well as assistants and dispersants. Suitable grinding resins are described in, for example, EP-A 107 089, EP-A 251 772 or the German Application P 41376390.0.

The deposition of coating films in cathodic electrocoating is usually carried out at 20°–35° C., preferably 26°–32° C., in the course of 5–500, preferably 60–300, seconds at deposition voltages of 50–500 V. The article to be coated is made the cathode.

The coating films can then be baked at 120°–200° C., preferably 140°–180° C.

Coatings of an electrocoating finish which afford excellent edge corrosion protection and at the same time have good mechanical properties and good surface corrosion protection are obtained in this manner.

Preparation of a novel binder

EXAMPLES 1 TO 4

Preparation of the intermediate (A)

11.3 kg of a diglycidyl ether based on bisphenol A and epichlorohydrin (EEW 188) were heated with 3.08 kg (9.06 mol) of bisphenol A and 4.30 g of triphenylphosphine in 750 g of 1,2-propylene glycol monophenyl ether at 130° C. until an EEW of 435 was reached, the product was dissolved in 5 kg of isobutanol and 500 g of butylglycol and the solution was reacted at 50°–55° C. with 1.01 kg (13.5 mol) of methyl ethanolamine until an EEW of 750 was reached (EEW = epoxide equivalent weight).

Preparation of the intermediate (B2)

The amidoamine was prepared by reacting 5.15 kg (50 mol) of diethylenetriamine, 7.25 kg (13.0 ml) of dimeric linseed oil fatty acid and 1.40 kg (5.0 mol) of linseed oil fatty acid in 1.5 kg of xylene at 150°–175° C. while distilling off the water of reaction. The product thus obtained had a solids content of 90%, an amine number of 464 mg/g and an acid number of <2 mg/g.

The amounts, stated in Table I below, of the intermediate (B2) and of a bistriethylenetetramine-terminated polyisobutylene (TETA-PIB) having an average molecular weight $\bar{M}_w$ of 2,000 and an amine number of 135±5 mg KOH/g were mixed homogeneously and then added to the intermediate (A), and the particular stated amount of a solvent mixture of iosbutanol and n-butylglycol in a ratio of 9:1 was added. The reaction mixture was then reacted for a further two hours at 80° C.

For comparison, a binder was prepared (Example 5) which contained no polyisobutylene but was obtained similarly from the intermediates (A) and (B2) (for amounts, see Table I).

TABLE I

| Binder | Amidoamine (B2) [g] | TETA-PIB (B1) [g] | Solvent [g] | Amine number [mg KOH/g] |
|---|---|---|---|---|
| Example 1 | 3950 | 1553 | 2230 | 132 |
| Example 2 | 3511 | 3106 | 2810 | 127 |
| Example 3 | 3072 | 4659 | 3310 | 119 |
| Example 4 | 2195 | 7765 | 7250 | 105 |
| Example 5 | 4389 | — | 1690 | 137 |

The binders according to Examples 1–3 and Example 5 had a solids content of 65% weight, and the binder according to Example 4 had a solids content of 70% by weight.

Preparation of crosslinking agent 1.5 kg of the diglycidyl ether based on bisphenol A and epichlorohydrin (EEW 188) were heated with 2.19 kg of bisphenol A and 1.25 g of triphenylphosphine for two hours at from 150° to 160° C. and then diluted with 2.1 kg of methyl isobutyl ketone.

For the preparation of the half-blocked diisocyanate, 2.4 kg of toluylene diisocyanate (mixture containing the 2,4- and the 2,6-isomer in a ratio of 80:20) were dissolved in 871 g of toluene and reacted at 50° C. with a mixture of 722 g of dimethylaminopropanol and 323 g of ethanol.

The solution of the half-blocked diisocyanate was added dropwise to the phenol resin solution in the course of 90 minutes, the reaction temperature being maintained so that it did not exceed 90° C. 1.55kg of dibutylamine and 361 g of paraformaldehyde were then added and the mixture was kept at 90°–95° C. for six hours.

The water of reaction formed was then distilled off under reduced pressure. The solution of the crosslinking agent had a solids content of 80% by weight and an amine number of 120 mg KOH/g of solid substance.

Preparation of the binder dispersions

The amounts, stated in Table II below, of 50% strength aqueous lactic acid were added to 1.18 kg of binder resin having a solids content of 65% by weight (Examples 1, 2, 3 and 5) or 1.27 kg of binder resin having a solids content of 70% by weight (Example 4). The particular stated amounts of water were added a little at a time to the homogenized mixture at 50° C. while stirring. About 1.2 kg of the solvent/water mixture were then distilled off at from 40° to 50° C. and 100 mbar, 1.2 kg of water simultaneously being added. The finely divided, stable dispersions were obtained.

TABLE II

| Dispersion | Binder according to Example | Acid [g] | Water | Solids content [% by wt.] |
|---|---|---|---|---|
| D1 | 1 | 67.8 | 1188 | 35.1 |
| D2 | 2 | 65.2 | 1191 | 35.0 |
| D3 | 3 | 61.1 | 1195 | 35.1 |
| D4 | 4 | 54.0 | 1110 | 34.9 |
| D5 | 5 | 70.4 | 1185 | 35.0 |

Preparation of the dispersion of crosslinking agent 11.55 g of acetic acid were added to 394.7 g of the crosslinking resin having a solids content of 80%, and the mixture was heated to 50° C. 462.8 g of water were then added and 225g of solvent/water mixture were distilled off at 100 mbar and at from 40° to 50° C. with the addition of 225 g of water. A finely divided, stable dispersion having a solids content of 35% by weight was obtained.

Preparation of the pigment paste

First, a grinding resin was prepared by the following method:

A mixture of 805.4 g of diglycidyl ether based on bisphenol A and having an EEW of 188, 379.2 g of polyoxybutylene diglycidyl ether having an EEW of 415, 205.2 g of bisphenol A, 117.8 g of dodecylphenol, 98.2 g of nonylphenol and 42.6 g of propylene glycol phenyl ether was heated to about 130° C. and 0.5 g of triphenylphosphine was added. The reaction mixture was then kept at this temperature by cooling until an EEW of 475 had been reached, after which 89.7 g of propylene glycol monoethyl ether were run in. First 478.8 g of linseed oil fatty acid and 222.6 g of diethylaminopropylamine were added in the course of one hour, the reaction temperature being kept at 80° C., if necessary by cooling. After the epoxide value had decreased to zero, 102.6 g of paraformaldehyde were added and the reaction mixture was stirred at 80°-90° C. until the conversion of formaldehyde was complete. The grinding resin thus obtained had a solids content of 94.8% by weight and an amine number of 81 mg KOH/g.

To prepare the pigment paste, 388.2 g of the grinding resin thus obtained were mixed with 77.6 g of 50% strength by weight aqueous lactic acid and 845 g of water. Thereafter, 800 g of titanium dioxide, 11.0 g of carbon black and 50 g of basic lead silicate were added and the entire mixture was milled in a ball mill to a particle size of <7 μm. The paste had a solids content of 60% by weight.

Preparation of the electrocoating baths

Various electrocoating baths were then prepared with the dispersions described above, with the addition of the pigment paste. For this purpose, 1,062 g of the binder dispersions were first thoroughly mixed with 926 g of the dispersion of crosslinking agent and 620 g of paste and then brought to a bath volume of 5000 ml by dilution with demineralized water, the resulting solids content of the baths being 21%. The baths were then allowed to age for 5 days at room temperature.

The electrocoating finishes prepared in this manner were deposited on phosphatized steel sheets and untreated steel sheets (deep-drawnsheets) which had been made the cathode, at 27° C. in the course of 2 minutes, the finishes having layer thicknesses of from 22 to 25 μm after baking for 25 minutes at 140° C. in a through-circulation oven.

The deposition voltage and the results of the mechanical test are shown in Table III below.

TABLE III

| Bath/Dispersion No. | U [V] | LT [μm] | Leveling 1-5 | RI [Nm] | EC [mm] | CH 1-5 |
|---|---|---|---|---|---|---|
| 1/D1 | 340 | 23 | 1-2 | 15.8 | 8.3 | 1 |
| 2/D2 | 340 | 22 | 2 | 15.8 | 8.1 | 1 |
| 3/D3 | 350 | 23 | 2 | 15.8 | 7.9 | 1 |
| 4/D4 | 320 | 25 | 2-3 | 18.8 | 8.0 | 1-2 |
| 5/D5 | 350 | 23 | 1-2 | 11.2 | 8.1 | 1-2 |

LT: Layer thickness
RI: Reverse impact; determination with a mandrel impact tester from Gardner according to ASTM D 2794
EC: Erichsen cupping according to ISO 1520
CH: Crosshatch;
Rating 1: no delamination
Rating 5: complete delamination
Leveling:
Rating 1: very good
Rating 5: insufficient The novel finishes have adhesion and flexibility which is just as good as those of a conventional finish (Example 5).

Furthermore, the deposited coating films were subjected to a climatic cycling test (CCT) according to DIN 50 021 (10 cycles, films on phosphatized steel sheets). A salt spray test (SST) according to DIN 50 017 was carried out over 360 hours on coating films which had been deposited on untreated deep-drawn sheets.

On the one hand, the surface rust S was rated:
Rating 0=no rust
Rating 5=severe rusting with blister formation
The edge rust E was also rated:
Rating 0=no attack
Rating 5=exposed edge with severe rusting
The undermigration U due to rust at a prepared scratch was measured in mm (averaged over the total length on one side).

The results are shown in Table IV.

TABLE IV

| Bath No. | CCT E/S/U | SST E/S/U |
|---|---|---|
| 1 | 2/0/0.5 | 4/1/0.9 |
| 2 | 1/0/0.6 | 2/0/1.0 |
| 3 | 0/0/0.6 | 1/0/0.9 |
| 4 | 0/0/0.5 | 0/0/0.9 |
| 5 | 4/0/0.4 | 5/2/0.9 |

It can clearly be seen that the loading of the edge and the resulting edge corrosion protection is improved in the case of the novel finishes. Even in the case of untreated steel sheets, very good edge corrosion protection is obtained.

We claim:

1. A polymer which is suitable as a binder and is obtainable by reacting
   (A) a base resin which has an average molecular weight $\overline{M}_w$ of from 200 to 5,000 and contains on average from 1 to 3 epoxy or isocyanato groups as the reactive groups per molecule with
   (B) a mixture of
      (B1) 5 to 50% by weight of a polyisobutylene terminated by primary amino groups and having an average molecular weight $\overline{M}_w$ of from 500 to 5,000 and
      (B2) 5-95% by weight of an amidoamine carrying primary amino groups and obtained by condensation of diprimary diamines of 2 to 20 carbon atoms with aliphatic $C_2$–$C_{44}$-dicarboxylic acids, the amounts being such that from 1 to 5 equivalents of primary amino groups of (B) are present per equivalent of the reactive group of (A).

2. A polymer which is suitable as a binder, as claimed in claim 1, containing a component (B2) in whose preparation 2–20 mol % of the dicarboxylic acid are replaced with an aliphatic $C_{12}$–$C_{18}$-monocarboxylic acid.

3. A polymer which is suitable as a binder, as claimed in claim 1, in which an epoxy resin is used as component (A).

4. A process for the preparation of a polymer as claimed in claim 1, wherein (A) a base resin which has an average molecular weight $\overline{M}_w$ of from 200 to 5,000 and contains on average from 1 to 3 epoxy or isocyanato groups as the reactive groups per molecule is reacted with (B) a mixture of (B1) 5 to 50% by weight of a polyisobutylene which is terminated by primary amino groups and has an average molecular weight $\overline{M}_w$ of from 500 to 5,000 and (B2) 5–95% by weight of an amidoamine which carries primary amino groups and is obtainable by condensation of diprimary diamines of 2 to 20 carbon atoms with aliphatic $C_2$–$C_{44}$-dicarboxylic acids, in the presence of an organic solvent, the amounts being such that from 1 to 5 equivalents of primary amino groups of (B) are present per equivalent of reactive groups of (A).

5. An aqueous dispersion containing 1–30% by weight of a polymer as claimed in claim 1.

6. An aqueous dispersion as claimed in claim 5, wherein the polymer is present in protonated form.

7. An electrocoating bath for cathodic electrocoating, containing 1–20% by weight of a polymer as claimed in claim 1.

8. An electrocoating bath for cathodic electrocoating, containing an aqueous dispersion as claimed in claim 5.

9. A coated article, obtainable by coating a substrate with a polymer as claimed in claim 1.

10. A coated article, obtainable by cathodic electrocoating with an electrocoating bath as claimed in claim 8.

* * * * *